Dec. 5, 1939.  B. E. THOMAS  2,182,711
FLEXIBLE COUPLING
Filed Sept. 2, 1937   3 Sheets-Sheet 1
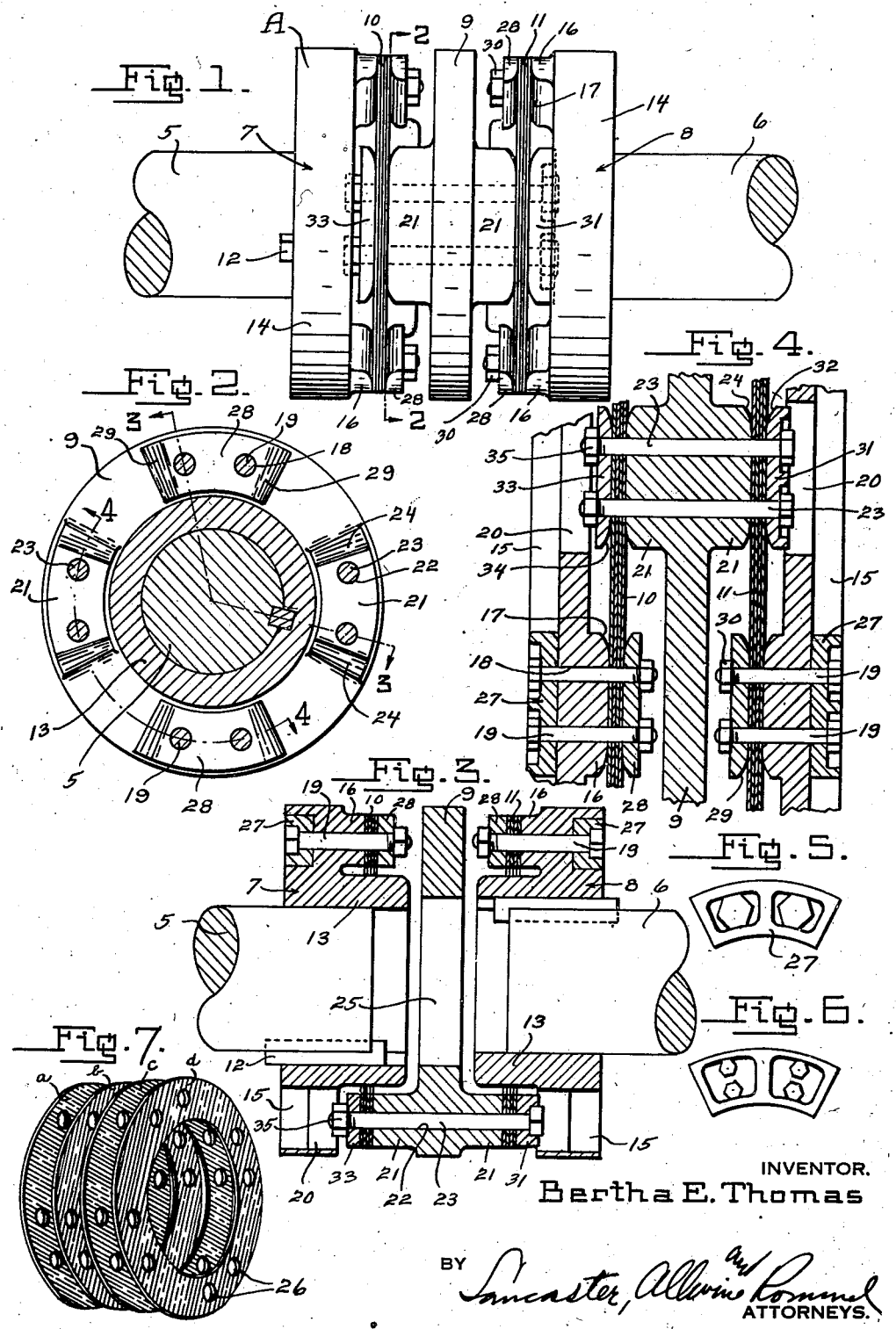
INVENTOR.
Bertha E. Thomas
BY Lancaster, Allwine Rommel
ATTORNEYS.

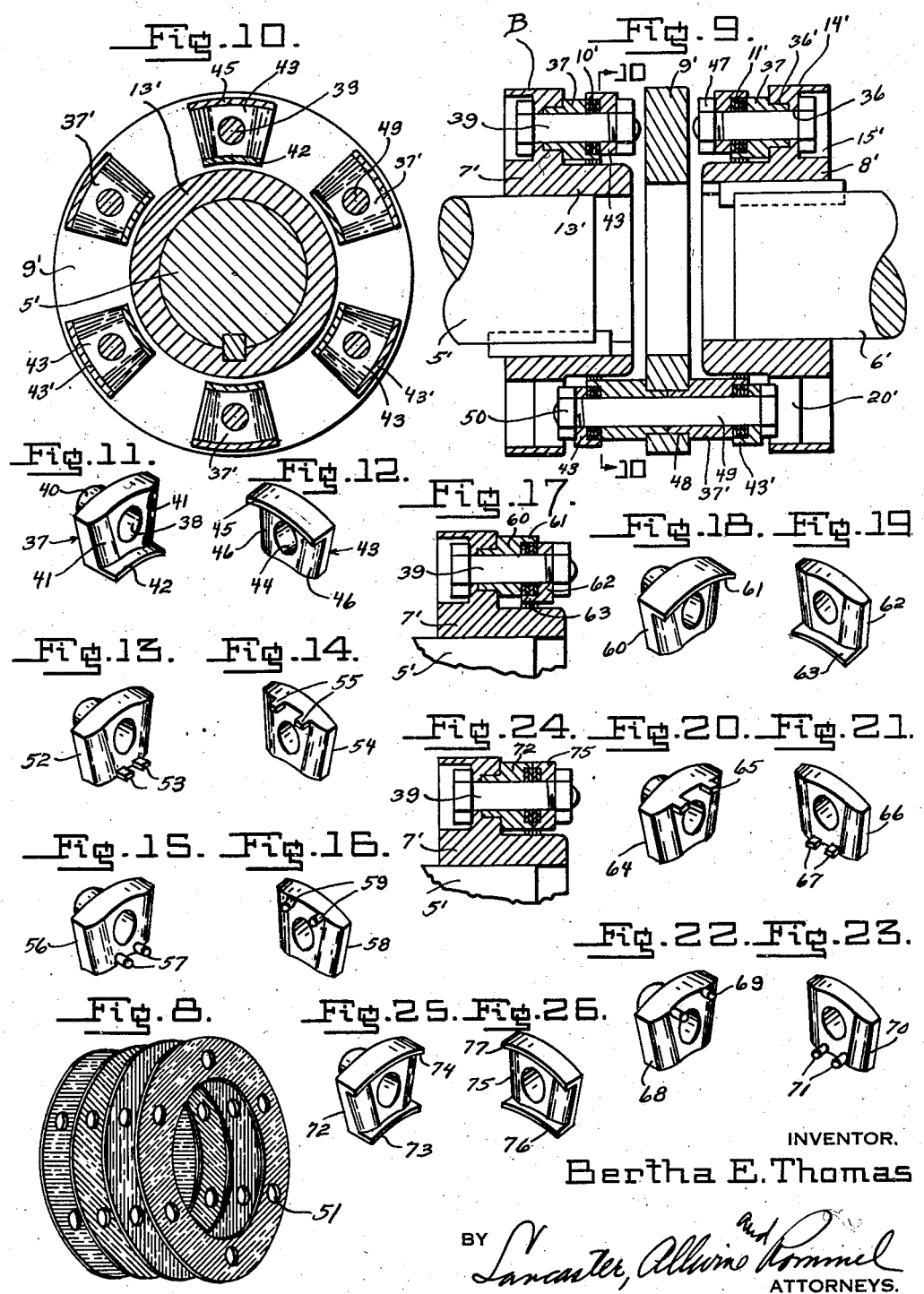

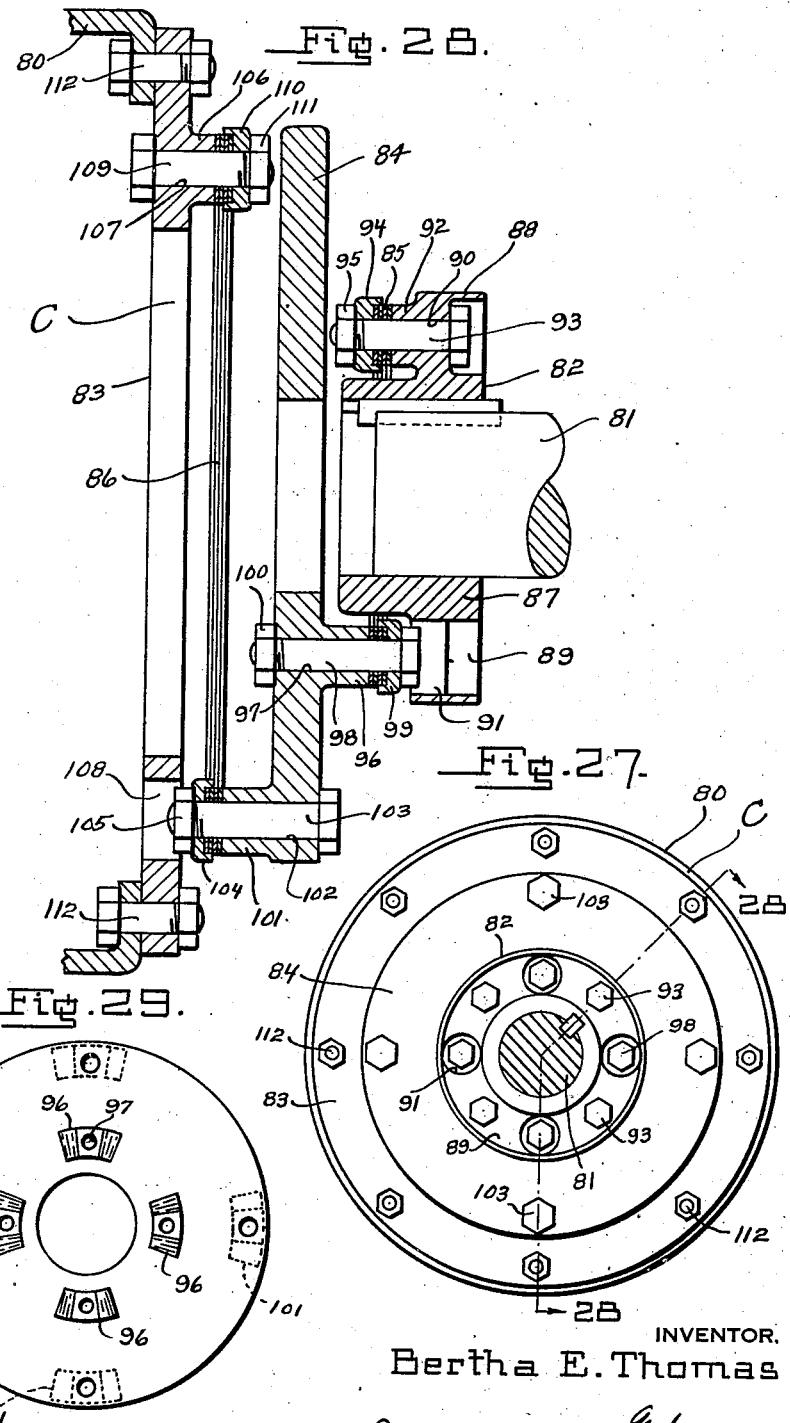
Dec. 5, 1939.  B. E. THOMAS  2,182,711
FLEXIBLE COUPLING
Filed Sept. 2, 1937   3 Sheets-Sheet 3
INVENTOR.
Bertha E. Thomas
BY Lancaster, Allwine Rommel
ATTORNEYS.

Patented Dec. 5, 1939

2,182,711

UNITED STATES PATENT OFFICE 2,182,711

FLEXIBLE COUPLING

Bertha E. Thomas, Warren, Pa., assignor to Thomas Flexible Coupling Company, Warren, Pa., a corporation of Pennsylvania Application September 2, 1937, Serial No. 162,205

11 Claims. (Cl. 64—13)

The present invention relates to flexible shaft couplings and more particularly to certain improvements in a flexible shaft coupling such as disclosed in my issued Patent 1,326,993 granted January 6, 1920.

The primary object of the present invention is to provide an improved flexible coupling which will provide a positive driving connection between its connected shafts and permit angular and parallel misalignment of the shafts without friction, wear or undue strain upon the flexible elements thereof.

A further object of the invention is to provide a flexible coupling wherein bending strain of the flexible coupling elements will be distributed on a line circumferentially of the coupling in a manner so as to prevent any sharp or abrupt bending of the elements when end play or misalignment of the shafts occurs.

A further object of the invention resides in the provision of a flexible coupling embodying improved features of assembling which will permit replacement of the intermediate coupling elements while the coupling members are in fixed position upon their respective shafts.

A still further and important object of the invention is to provide a laminated flexible metal disc ring having the laminations thereof so related to one another as to provide maximum strength and evenly distributed flexibility.

Other objects and advantages of the invention will be apparent from the following detailed description, taken in connection with the accompanying drawings forming a part of this specification and in which drawings:

Figure 1 is a view in side elevation of the improved flexible coupling.

Figure 2 is a transverse section on the line 2—2 of Figure 1.

Figure 3 is a longitudinal section on the line 3—3 of Figure 2.

Figure 4 is a fragmentary circumferential section on the line 4—4 of Figure 2.

Figure 5 is a plan view of a ribbed two hole washer as shown in Figures 1 to 4 and showing the bolt heads held against turning by the marginal ribs on the washer.

Figure 6 is a plan view showing a ribbed four hole washer.

Figure 7 is a perspective view of a group or series of flexible metal discs shown in circumferentially offset relation for assembling into a laminated flexible disc ring of a four point coupling type as shown in Figure 1.

Figure 8 is a perspective view similar to Figure 7 but showing the discs as arranged for a six point coupling such as shown in Figure 10.

Figure 9 is a longitudinal section through a slightly modified form of coupling having a six point coupling for the laminated rings and employing separable bosses and washers of the single bolt type.

Figure 10 is a transverse section on line 10—10 of Figure 9.

Figure 11 is a perspective view of one of the separable bosses as shown in Figure 9.

Figure 12 is a perspective view of one of the washers as shown in Figure 9.

Figure 13 is a perspective view of a modified form of separable boss of the single bolt type having extended lugs along its inner edge.

Figure 14 is a perspective view of a washer for use with the boss shown in Figure 13 and having extended lugs along its outer edge.

Figures 15 and 16 are perspective views of a boss and washer respectively, the boss having extended spaced apart pins along its inner edge and the washer having extended spaced apart pins along its outer edge.

Figure 17 is a fragmentary longitudinal section through the coupling showing a modified form of boss and washer from that shown in Figures 9 to 12.

Figures 18 and 19 are perspective views respectively of the boss and washer shown in Figure 17.

Figures 20 and 21 are perspective views respectively of a boss and washer having the position of the lugs reversed from that shown in Figures 13 and 14.

Figures 22 and 23 are perspective views respectively of a boss and washer having the position of the pins reversed from that shown in Figures 15 and 16.

Figure 24 is a fragmentary longitudinal section thru the coupling showing the boss and washers provided with an extended lip at both the inner and outer arcuate edges thereof.

Figures 25 and 26 are perspective views respectively of the boss and washer shown in Figure 24.

Figure 27 is an end view of a modified form of the flexible coupling having the laminated metal disc rings of different radii.

Figure 28 is an enlarged sectional view on line 28—28 of Figure 27.

Figure 29 is a side elevation of the center ring of the coupling shown in Figure 27.

In the drawings and wherein like reference characters designate corresponding parts throughout the views, and referring first to the form of the invention as disclosed in Figures 1 to 7 inclusive, the letter A designates the improved coupling as a whole, connecting the adjacent ends of the shafts 5 and 6, either of which may be the driving shaft. The coupling A embodies a pair of duplicate coupling members 7 and 8, between which is disposed a center or coupling ring 9, and a pair of laminated metal disc rings 10 and 11 which respectively provide a flexible connection between the coupling member 7 and center ring 9, and between the coupling member 8 and the center ring 9. The coupling members 7 and 8 may be secured to the shafts 5 and 6 by means of keys 12 or by other suitable means whereby the ends of the shafts are slightly separated as in Figure 3.

The coupling members 7 and 8 are of identical construction and each is formed with a hub 13 having a flange 14 formed on the outer end of the hub. The outer face of the flange 14 is provided with an annular groove 15 co-axial with the hub 13. Formed on the inner face of the flange 14, in evenly spaced apart relation, are elongated segmental-shaped bosses 16 and which in the examples shown in Figures 1 to 4 are two in number and are arranged in diametrically disposed relation. These bosses 16 have their bearing surfaces rounded or eased off at each end of the boss in a slight curve or arc as at 17. As will be observed particularly in Figures 1 and 4, these curves or arcuate end surfaces 17 have their axes of generation on a line radially of the coupling and the surfaces 17 curve in circumferential relation to the flange. Each boss 16 is provided with two transverse openings 18 for receiving coupling bolts 19, and provided in the flange 14 midway between the boss 16 is an elongated arcuate opening 20 extending thru the annular groove 15.

Referring now to the center or coupling ring 9, this ring has formed upon opposite faces thereof, aligned segmental-shaped bosses 21 which are elongated circumferentially of the ring and are provided with two openings 22 for receiving coupling bolts 23. The bearing surfaces of these bosses 21 are also eased off at each end of the boss in a slight curve or arc as at 24 whereby these curved end surfaces curve in circumferential relation to the center ring. The center ring is provided with an axial opening 25, and the bosses 21 at each side of the ring are arranged in diametrically disposed relation for positioning between the bosses on the coupling members 7 and 8 when the coupling is assembled.

The laminated flexible rings 10 and 11 for providing a flexible coupling between the center ring 9 and the coupling members 7 and 8, are formed from a suitable number of thin rolled metal discs such as shown at a, b, c and d in Figure 7. In the rolling of metal into thin sheets, a grain is produced in the metal so that the strength of the metal is to some degree dependent upon the direction in which the grain runs. As will be observed in Figure 7, the thin metal discs are assembled in such relation that the grain of the metal of one disc, indicated by the parallel lines across the disc, will be at an angle radially to the grain of the disc with which it is in contact. In the example illustrated in Figure 7, wherein the laminated ring embodies four discs or laminations, the grain of the metal in adjacent discs will be circumferentially offset for 90°. Each of the discs a, b, c and d is provided with four companion pairs of openings 26 which are arranged 90° apart and one diametrically disposed pair of these openings 26 is adapted to receive the bolts 19, while the other diametrically disposed pair of the openings are adapted to receive the bolts 23. The laminated rings 10 and 11 are disposed one between the center ring and the coupling member 7 and the other between the center ring and the coupling member 8, with opposite faces of the rings alternately contacting the bosses 16 and 21.

The heads of the coupling bolts 19 which connect the laminated rings to the respective coupling members, are seated in elongated arcuate-shaped washers 27 which fit in the annular groove 15. These washers 27 are formed with ribs which the bolt heads engage for preventing the bolts from turning as shown in Figure 5. Fitting over the inner threaded end of each companion pair of bolts 19 to co-act with the bosses 16 is a plain arcuate-shaped washer 28 having its end edges rounded or eased off as at 29. Nuts 30 threaded upon the inner ends of the bolts 19, secure the laminated rings to their respective coupling members with one face of the ring engaging the bearing surface of the bosses 16 and the opposite face engaging the bearing surface of the washers 28. As shown in Figures 1 and 4, the rounded end edges 17 of each boss 16 and the rounded end edges 29 of its co-acting washer 28 provide circumferentially flared surfaces at each end of the surfaces of attachment of the laminated rings to the coupling members, thus permitting the rings to flex in either direction with a distribution of the strain of bending instead of allowing the strain to concentrate at a sharp edge when end play or misalignment of the shafts 5 and 6 occurs.

As will be noted particularly in Figure 3, the laminated metal rings 10 and 11 are of a width equal to the width of the ring engaging surfaces of the bosses and their respective washers. Thus, the rounded end surfaces of the bosses and washers extend across the entire width of the flexible rings on a line radially of the rings whereby during flexing of the rings in either direction, the rings will have full width contact with the rounded end surfaces so that the strain of pull is distributed across the entire width of the rings.

The heads of the coupling bolts 23 which connect the laminated rings to the center ring 9 are seated and held against rotation in elongated arcuate washers 31 which are freely movable through and align with the arcuate openings 20 in the coupling member 8. These washers 31 co-act with the bosses 21 on one side of the center ring and have their end edges rounded or eased off as at 32 whereby the end edges of the washers 31 and co-acting bosses 21 provide circumferentially flared surfaces at each end of the points of attachment of the laminated ring 11 to the center ring. Fitting over the threaded end of each companion pair of bolts 23 to co-act with the bosses 21 at the other side of the center ring are plain arcuate-shaped washers 33 which are freely movable thru and align with the arcuate openings 20 in the coupling member 7. These washers 33 have their end edges rounded or eased off as at 34 to provide circumferentially flared end surfaces similar to the flared surfaces 17 and 29 etc. Nuts 35 threaded on the bolts 23 secure the laminated rings to the center ring 9.

In the form of coupling shown in Figures 1 to 4, the bosses 16 have been shown formed integral with the coupling members, and the bosses 21 formed integral with the center ring 9. The bosses 16 and 21 also act as spacers for spacing the laminated rings and it will be noted that the inner end of the coupling bolts 19 are spaced slightly from the center ring so as to permit insertion of a suitable wrench upon the nuts 30. With the form of coupling shown in Figures 1 to 4, the laminated rings 10 and 11 each have a four point engagement, two points of engagement being with their respective coupling members and two with the center ring. The number of points of engagement of the rings may vary however, as shown in Figure 10.

In assembling the improved coupling, the construction is such as to permit replacement of the intermediate coupling elements such as the center ring 9 and the laminated rings 10 and 11 while the coupling members 7 and 8 are in fixed position upon their respective shafts 5 and 6. With the coupling members 7 and 8 secured upon their shafts, the laminated rings 10 and 11 are secured to the coupling members by the bolts 19. The center ring 9 may then be slid into position between the laminated rings and the bolt holes 22 therein aligned with proper openings 26 in the laminated rings. The bolts 23 may then be slid thru the openings in the washers 31 and this assembly of bolt and washer inserted thru the opening 20 in the coupling member 8, the bolts 23 passing thru the ring 10, center ring 9 and ring 11. The plain washer 33 may then be slid over the threaded end of the bolts 23 and the nuts 35 tightened by a socket wrench inserted thru the opening 20 in the coupling member 7. The ribbed washers 31 will prevent turning of the bolt 39 while the nuts 35 are being tightened. While two bolts have been shown provided at each attaching point of the laminated rings, it will be apparent that merely one bolt may be employed if desired.

Referring now to the form of the invention as disclosed in Figures 8 to 12 inclusive, in this form of the invention, separable bosses are provided and a single bolt is provided for attachment of the bosses. The coupling B embodies a pair of duplicate coupling members 7' and 8' respectively keyed to the shafts 5' and 6' and having disposed therebetween a center or coupling ring 9'. Providing a flexible coupling between the center ring 9' and the coupling member 7' is a laminated metal disc ring 10', while flexibly connecting the center ring and the coupling member 8' is a laminated metal disc ring 11'. The coupling members 7' and 8' are of identical construction and each embodies a hub 13' having a flange 14' formed on the outer end of the hub. The outer face of the flange 14' is provided with an annular groove 15' and an annular series of openings 36 is provided in the flange. These openings 36 are counterbored at their inner ends as at 36' and at their outer ends open into the annular grooves 15'. In the example shown, there are three of these openings 36 in each flange 14' and each of these openings is adapted to receive a separable boss 37 such as shown in Figure 11.

These separable bosses 37 are of a single bolt type and are provided with a transverse opening 38 for receiving a single attaching bolt 39, the head of which is adapted to be disposed in the annular grooves 15'. The outer side of the boss 37 is provided with a sleeve 40 adapted to engage in the counter-bored portion 36' of the openings 36. These bosses 37 are intended to be disposed upon the inner face of the flange 14' and have their inner faces rounded or eased off at each end as at 41. Extending inwardly along the lower edge of the boss 37 is a lip 42 and these lips are intended to engage the inner circumference of the laminated rings and provide means for retaining the bosses in position against rotation with the rounded edges 41 in circumferential relation to the laminated ring. Co-acting with each of the separable bosses 37 is a washer 43 having a transverse bolt-receiving opening 44 and provided along its outer arcuate edge with an extended lip 45 adapted to engage over the outer edge of the laminated rings to prevent turning of the washer. The bearing face of the washer 43 has its end edges rounded or eased off as at 46. The nut 47 threaded upon the inner end of each bolt 39 serve to retain the laminated rings in position between the bosses 37 and washers 43 and this assembly in position upon the coupling member. Thus, the lip 42 of the bosses 37 and the lip 45 of the washers 43 permit use of the single coupling bolt 39 and retain the rounded end edges 41 and 46 in proper position extending transversely across the laminated rings.

The center ring 9' is provided with a number of evenly spaced apart openings 48 which, in the assembled coupling are disposed midway between the openings 36 and align with openings 20' provided in the flanges 14'. A separable boss 37' of like construction as that of the boss 37 is fitted by its sleeve portion into opposite ends of the openings 48 whereby the bosses 37' project from opposite sides of the center ring 9'. Extended through the openings in these aligned bosses 37' is a coupling bolt 49. The washers 43 for co-acting with the bosses 37' are identical to the washers 43 and have the lip along their outer edges for engaging the outer edges of the laminated rings. The nuts 50 threaded on the end of each coupling bolt 49 serve to retain the bosses 37' in position on the center ring 9' and the laminated rings in position between the bosses 37' and the washers 43'. The openings 20' permit insertion of the bolt 49 during assembling of the coupling.

With use of the separable bosses upon both the coupling members and the center ring, the replacement of bosses may be accomplished without removal of the coupling members from the shafts. While the separable bosses have been shown fastened to the coupling members and center ring by means of the same bolts that hold the laminated rings in position, these bosses may be otherwise fastened to the coupling members and center ring such as by welding or otherwise if so desired.

As shown in Figure 8, the thin metal discs forming the laminations of the rings 10' or 11' have a series of openings 51 which are six in number and through which the bolts 39 and 49 are alternately passed. As shown by the parallel lines across the discs shown in Figure 8, the grain of the metal in adjacent discs will be circumferentially offset for 60°.

Figure 13 shows a slightly modified form of the separable boss adaptable for use with the coupling shown in Figure 9. The boss 52 shown in Figure 13 is of the single bolt type and is provided along its inner edge with extended lugs 53 for functioning in a like manner as does the lip 42 of the boss 37. Figure 14 shows a washer 54 of a type for use with the boss 52 and having extended lugs 55 along its outer edge functioning in a like manner as does the lip 45 of the washer 43.

In Figure 15, the boss 56 is provided along its inner edge with extended pins 57, while the washer 58 shown in Figure 16 is provided along its outer edge with extended pins 59.

In Figures 17, 18 and 19, the separable boss 60 has been shown with an extended lip 61 along its outer edge while the washer 62 has been shown with an extended lip 63 along its inner edge. In Figure 17, like reference numerals have been applied to corresponding parts as shown in Figure 9.

Figure 20 shows the separable boss 64 provided with extended lugs along its outer edge, while Figure 21 shows the washer 66 provided with extended lugs 67 along its inner edge.

Figure 22 shows the separable boss 68 provided with extended pins 69 along its outer edge, while the washer 70 shown in Figure 23 has extended pins 71 along its inner edge.

It will be noted that Figures 18 and 19 differ from Figures 11 and 12 in the position of the lip; Figures 21 and 22 differ from Figures 13 and 14 in the position of the lugs, while Figures 22 and 23 differ from Figures 15 and 16 in the position of the pins.

Referring to Figures 24 to 26, the separable boss 72 shown in Figure 25 has an extended lip 73 along its inner edge and also an extended lip 74 along its outer edge. The washer 75 shown in Figure 26 has an extended lip 76 along its inner edge and also an extended lip 77 along its outer edge.

In all of the various modified forms of separable bosses and washers as shown in Figures 11 to 26 inclusive, it will be observed that the end edges of the bosses and washers are rounded or eased off so that when in assembled relation these rounded edges provide flaring surfaces which extend across the full width of the rings at opposite ends of each point of attachment of the laminated rings.

Referring now to the form of the invention as disclosed in Figures 27 to 29, the form of coupling disclosed therein provides among other advantages, a space factor which is desirable in certain applications of the coupling as for example when the coupling is used on an engine drive and one side of the coupling is bolted to the fly wheel. In the example illustrated, coupling C has been shown as forming a flexible coupling between a fly wheel or the like 80 and a shaft 81. The coupling C embodies a coupling member 82 for attachment upon the shaft 81, a coupling member 83 for attachment to the driving member or fly wheel 80, and a center ring 84 having flexible connection at one side with the coupling member 82 by means of a laminated metal disc ring 85 and at its other side with the coupling member 83 by means of a laminated metal disc ring 86.

The coupling member 82 embodies a hub 87 provided at its outer end with a flange 88 having an annular groove 89 provided in its outer face. Provided in the flange 88 is a series of alternately arranged openings 90 and 91, the openings 91 being of greater diameter than the openings 90. Formed on the inner face of the flange 88 in alignment with the openings 90 is a boss 92 through which the openings 90 extend. In the example illustrated, there are four of these bosses 92 having rounded or eased off end edges similar to the bosses shown in Figure 1. Extended through each of the openings 91 with their heads in the annular grooves 89, are coupling bolts 93 having their inner threaded ends extended through openings in the laminated ring 85 and also through washers 94 which have been shown as being of the type illustrated in Figure 26 and having an extended lip along both its inner and outer edges. A nut 95 is threaded upon the inner end of each bolt 93 for securing the ring 85 to the coupling member 82.

Provided on one face or side of the coupling ring 84 is an annular series of bosses 96 through each of which is extended an opening 97 for receiving a coupling bolt 98. These bosses 96 have their end edges rounded or eased off and co-act with washers 99 similar to the type shown in Figure 26 for clamping the laminated ring 85 to a center ring at points spaced midway between the bosses 92. As will be observed in Figure 29, there are four of the bosses 96 whereby these bosses together with the bosses 92 provide an 8 point attachment to the ring 85. The bolts 98 are provided with nuts 100 whereby the ring 85 is clamped between the boss 96 and washer 99.

Formed on the opposite side of the center ring 84 from that at which the lugs 96 extend, is an annular series of four bosses 101 as shown in dotted lines in Figure 29, and extended through each of the bosses 101 is an opening 102 for receiving a coupling bolt 103. These bosses 101 are arranged in radial alignment with the bosses 96 and are arranged on a circle having a greater radius than the circle of the bosses 96. The laminated ring 86 is adapted to have one face bear upon the bosses 101 and be clamped thereagainst by washers 104 against which nuts 105 on the bolts 103 act. As will be observed, the laminated ring 86 is of greater diameter than that of the laminated ring 85.

The coupling member 83 is provided on one side with an annular series of bosses 106 which are four in number and evenly spaced 90° apart on a circle of equal diameter to that of the openings 102 in the center ring 84. Extended through the coupling member at each of the bosses 106 is an opening 107 and provided in the coupling member 83 between each of the openings 107 is a larger opening 108 aligning one with each of the bolts 103. Extended through each of the openings 107 is a bolt 109 having its inner threaded end extending through openings in the laminated ring 86 and through washers 110. Threaded upon the inner end of each bolt 109 is a nut 111 serving to secure the ring 86 to the coupling member 83.

Thus it will be seen that the center ring 84 is coupled at opposite sides to the coupling members by laminated rings of different radii.

The coupling member 83 may be secured to the fly wheel or other driving member 80 in any preferred manner and in the example shown, bolts 112 are provided for securing the coupling member 83 at its peripheral portion to the fly wheel.

The openings 91 in the coupling member 82 will permit removal of the bolts 98, while the openings 108 in the coupling member 83 will permit removal of the nuts 105 whereby the center ring and the laminated rings may be placed and removed without disconnecting either of the coupling members 82 or 83.

Thus it will be seen that a flexible shaft coupling has been provided wherein the positive driving connection between the shafts will be had and angular and parallel misalignment of the shafts permitted without wear and undue strain upon the flexible coupling elements. With the improved coupling as disclosed, the flared end surfaces at the points of attachment of the laminated metal disc rings will allow the bending strain of the rings to be distributed over a greater area instead of being concentrated at a sharp edge when end play or misalignment of the shafts occur. It will also be seen that the flexible laminated metal disc rings are so constructed as to provide for maximum strength and uniform flexibility throughout their circumference.

Changes in details may be made to the forms of invention herein shown and described, without departing from the spirit of the invention or the scope of the following claims.

I claim:

1. A flexible shaft coupling comprising a pair of coupling members each having spaced apart bosses on its inner face, a centering ring disposed between the coupling members and having spaced apart bosses on each face thereof, a washer co-acting with each boss, a flexible ring disposed between each coupling member and the centering ring in engagement thruout its full width with the bosses and washers, said bosses and washers having each of their end edges rounded off in circumferential relation to the flexible rings with the axes of generation of the rounded edges on a line radially of the rings, and means for separately securing the flexible rings at alternate points to the coupling members and the center ring.

2. A flexible coupling comprising a pair of coupling members each having annularly arranged segmental-shaped bosses on its inner face provided with bearing surfaces having rounded ends, a center ring between the coupling members having annularly arranged segmental-shaped bosses on opposite faces thereof provided with bearing surfaces having rounded ends, a laminated metal ring disposed between each coupling member and the center ring to engage the bearing surfaces of the bosses, a segmental-shaped washer for each boss and having rounded ends, said rounded ends of the bosses and washers being convergent on the axis of the coupling and extending thruout the full width of the laminated ring, and a pair of securing bolts extending through each washer and its boss.

3. A flexible coupling comprising a pair of coupling members each having an annular series of elongated segmental-shaped bosses on its inner face, a pair of openings through each of said bosses, a center ring disposed between the coupling members and having elongated segmental-shaped bosses on each face thereof in aligning relation, a pair of openings through each of the aligning bosses on the center ring, a flexible laminated ring disposed between each coupling member and the center ring in engagement with the bosses thereof and having openings aligning with the openings in said bosses, an elongated segmental-shaped washer for each boss and having a pair of openings, said bosses and washers each having rounded end edges extending thruout the full width of the laminated rings, and bolts extending through the openings in said bosses, laminated rings and the washers for securing the elements in assembled relation.

4. A flexible coupling comprising a pair of coupling members each having a series of separable segmental-shaped bosses on its inner face, concentric to the axis of the coupling member, a center ring having a series of separable segmental-shaped bosses on each face thereof concentric to the axis of the ring, a flexible ring disposed between each coupling member and the center ring, a segmental-shaped washer for each boss, means for retaining the bosses and washers concentric with the flexible rings, said bosses and washers having rounded end surfaces extending thruout the full width of the flexible rings on a line radially of the rings, and a single bolt extending through each washer and its boss and securing the boss to its respective carrying element.

5. A flexible coupling comprising a pair of coupling members, a center ring disposed between the coupling members, a laminated ring disposed between each coupling member and the center ring, a series of separable segmental-shaped bosses on the inner face of each coupling member and each having an extended portion on one arcuate edge engageable with the laminated rings for preventing rotation of the boss, a series of separable segmental-shaped bosses at each face of the center ring and each having an extension on one arcuate edge engaging a laminated ring for preventing rotation of these bosses, a segmental-shaped washer for each boss and each having an extension on one arcuate edge engageable with a laminated ring for preventing rotation of the washer, said bosses and washers having each of their end edges rounded off in circumferential relation to the laminated rings and being of a width at least equal to the width of the laminated rings, and single securing bolts securing the bosses to their respective elements and clamping the laminated rings between the bosses and their respective washers.

6. A flexible coupling comprising a pair of coupling members each having a series of separable segmental-shaped bosses at its inner face provided with rounded end surfaces, a flange along one arcuate edge of each boss, a bolt extending through each boss for securing the bosses to the coupling members, a laminated ring for each coupling member and through which said bolts extend, said bosses being held against rotation through engagement of said flanges with the laminated rings, a segmental-shaped washer for each boss having an arcuate flange engageable with the laminated rings and provided with rounded end surfaces, a nut for each bolt and engaging said washers, a center ring disposed between the laminated rings and having separable segmental-shaped bosses on each side thereof arranged between the bosses on the coupling members and provided with rounded end surfaces, said bosses on the center ring having an arcuate flange engageable with the laminated rings, a segmental-shaped washer for each boss on the center ring and each having an arcuate flange engageable with the laminated ring and provided with rounded end surfaces, and a bolt for securing aligning bosses on the center ring in position and connecting the laminated rings to these bosses, said laminated rings having a width no greater than the width of the rounded end surfaces of the bosses and washers on a line radially of the coupling.

7. A flexible coupling transmission ring composed of a series of rolled sheet metal discs arranged with the grain of the metal in each disc at a predetermined angle to that of its next adjacent disc.

8. A laminated flexible ring composed of a series of thin rolled sheet metal discs assembled with the grain of the metal in adjacent discs in angular relation.

9. In a flexible coupling embodying laminated sheet metal coupling rings, that method of assembling the laminations whereby the grain of the metal in adjacent rings will be in angular relation.

10. A flexible coupling comprising a pair of coupling members, a center ring disposed between the coupling members, a flexible laminated sheet metal ring disposed between each coupling member and the center ring and having the grain of the metal of adjacent laminations thereof arranged in angular relation, and securing means for mounting the rings at spaced apart points between the coupling members and center ring whereby the bending strain on the rings between adjacent points of mounting is distributed thruout the full width of the rings in a direction circumferentially of the rings.

11. A flexible coupling comprising a pair of coupling members each having an annular series of segmental-shaped bosses on its inner face and with the bosses on one coupling member arranged on a greater radius than that of the companion coupling member, a center ring disposed between the coupling members having an annular series of segmental-shaped bosses on one face co-acting with the bosses on one coupling member and an annular series of segmental-shaped bosses on its opposite face co-acting with the bosses on the other coupling member, a flexible ring disposed between each coupling member and the center ring in engagement with the bosses, a segmental-shaped washer for each boss, said bosses and washers having each end rounded off and having a width at least equal to the width of the flexible rings, and a bolt extending through each boss for securing the flexible rings to the bosses.

BERTHA E. THOMAS.